United States Patent [19]

Bracking et al.

[11] Patent Number: 5,274,791
[45] Date of Patent: Dec. 28, 1993

[54] MICROPROCESSOR WITH OEM MODE FOR POWER MANAGEMENT WITH INPUT/OUTPUT INTIATED SELECTION OF SPECIAL ADDRESS SPACE

[75] Inventors: Jimmy E. Bracking; David E. Richter; James S. Blomgren, all of San Jose, Calif.

[73] Assignee: Chips and Technologies, Inc., San Jose, Calif.

[21] Appl. No.: 726,306

[22] Filed: Jul. 5, 1991

[51] Int. Cl.$^5$ .................... G06F 13/10; G06F 13/00
[52] U.S. Cl. .................... 395/425; 395/750; 395/275; 364/DIG. 1; 364/273.1; 364/232.9
[58] Field of Search ............... 395/500, 750, 425, 275

[56] References Cited

U.S. PATENT DOCUMENTS

| | | | |
|---|---|---|---|
| 4,030,073 | 6/1977 | Armstrong, Jr. | 364/200 |
| 4,591,982 | 5/1986 | Buonomo et al. | 395/375 |
| 4,736,290 | 4/1988 | McCallion | 364/200 |
| 4,926,322 | 5/1990 | Stimac et al. | 395/500 |

Primary Examiner—Lawrence E. Anderson
Attorney, Agent, or Firm—Elmer Galbi

[57] ABSTRACT

The present invention provides a microprocessor with a special OEM mode of operation that can be used by an OEM system integrator to implement special tasks such as power management. The OEM mode provided by the present invention is designed for use by a system integrator who integrates a microprocessor into a larger system such as a personal computer. The OEM mode of operation provided by this invention adds features to the overall system; however, it is transparent to system programmers. The system integrator can use the OEM mode to configure a system so that the system has certain special power management features, which can not be accessed by programmers who use the system. The OEM mode provided by the present invention is accessed by a signal on a special I-O pin. For example, an external timer can periodically provide signals to this special pin, thereby periodically interrupting the microprocessor and putting the microprocessor in the OEM mode. Special power management code stored in an external ROM can be executed each time the microprocessor is placed in OEM mode. At the end of the operations performed in OEM mode, the microprocessor is restored to the state where the OEM mode of operation began.

10 Claims, 4 Drawing Sheets

MICROPROCESSOR WITH OEM MODE FOR POWER MANAGEMENT WITH INPUT/OUTPUT INTIATED SELECTION OF SPECIAL ADDRESS SPACE

FIELD OF THE INVENTION

The present invention relates to digital computers and more particularly to single chip microprocessors for use in personal computers.

BACKGROUND OF THE INVENTION

The iAPX 86 family of single chip microprocessors is widely used in personal computers. Microprocessors termed the 8086, 80286, 80386 and 80486 are part of the iAPX 86 family. Microprocessors in the iAPX 86 family are commercially available from a number of vendors including Nippon Electric Corporation (NEC), Advanced Micro Devices Corporation (i.e. AMD) and Intel Corporation.

The 386 microprocessor is a relatively recent addition to the iAPX 86 family. It is generally understood in the industry that the number "386" applied to a microprocessor designates a microprocessor which has a particular type of architecture. The 386 architecture adds significant functions which were not available in the earlier members of the iAPX 86 family.

A 386 microprocessor has three modes of operation generally termed, (1) the "Virtual 8086 model", (2) the "Protected Virtual Address model" which is often referred to as the "Protected" mode, and (3) the "Real Address model" which is often referred to as the "Real" mode.

The virtual 8086 mode is a special compatibility mode that disables a significant portion of the microprocessor and allows a complex 386 microprocessor to act as if it were an 8086 microprocessor.

Protected mode allows a 386 microprocessor to run several tasks simultaneous, that is, in Protected mode a 386 can support multitasking. In order for a 386 microprocessor to operate in Protected mode, several segmentation and MMU-related tables must exist in memory.

Real mode is a simplified operating mode that can be used to establish the tables in memory required in order for a 386 to operate in Protected mode.

The general technology required to implement multitasking is well known and it has been implemented for many years on larger computer systems. Key to multitasking is the concept of memory protection and privilege hierarchy. There are many ways to implement protection schemes and there is much prior art on this subject.

The 386 has four levels of protection or privilege. When in protected mode, programs are not allowed to read or write data that has a higher level of privilege. Furthermore, some instructions can only be executed when the processor is operating in the mode with the highest level of privilege.

A 386 microprocessor includes hardware that can keep track of a large number of separate, distinct tasks. A 386 microprocessor also has hardware that can handle the mechanics of switching between tasks. Since the hardware keeps track of the tasks being performed, the operating system can direct its attention to deciding "when" to switch tasks, rather than having to handle the mechanics of determining "how" to switch between tasks.

There is a great deal of prior art that relates to multitasking and to switching states in computer systems. For example, see U.S. Pat. No. 4,907,150 (Arroyo) and the references cited therein. Two commercially available operating systems which implement multitasking on 386 type computers are "Windows/386" which is marketed by Microsoft Corporation and "OS/2" which is marketed by International Business Machines Corporation.

The present invention adds an entirely new mode of operation to a 386 microprocessor. The new mode of operation added by the present invention builds upon the multitasking and protected modes in existing 386 microprocessors; however, the present invention adds an entirely different set of capabilities to a 386 microprocessor. The multitasking mode of operation in the 386 microprocessor essentially gave the iAPX 86 family the type of multitasking that was previously available in large computer systems. The new mode of operation added by the present invention does not have a counterpart in existing large computer systems.

The present invention provides a unique mechanism for implementing special functions such as power management. Power management is particularly important in battery powered personal computers. As the battery level decreases, it is sometimes desirable to disable certain devices and to reduce the speed in other parts of the system. As the battery reaches still lower levels, it is sometimes desirable to terminate all functions except memory maintenance.

The prior art provides programming techniques which perform various power management functions in battery powered personal computers. For example, a program named "Battery Watch" is marketed by Traveling Software Corporation of Bothell, Wash. A computer with a 386 microprocessor can be programmed to perform power management tasks as one of the tasks performed in a multitasking system. However, the type of power management that can be performed by an operator controlled program is not as comprehensive power management possible with the present invention.

The present invention addresses specialized functions such as power management from a different prospective than that used by prior art systems. The present invention takes into account the fact that microprocessors are integrated into a system by a "system integrator" or "OEM manufacturer". The present invention provides a mode of operation that allows the system integrator or OEM manufacturer to build special functions into a 386 system and nevertheless maintain full compatibility to the 386 specifications.

The present invention provides a mechanism whereby the system integrator can insure that programs which perform tasks such as power management are periodically executed by a system. Furthermore, with the present invention the OEM system integrator is assured that special programs provided by the OEM manufacturer do not in any way conflict with any other programs which the user or programmer may load into the system.

The present invention provides a mechanism which can be used to reduce the power provided to system resources such as disk drives when they are not in use. Nevertheless with the present invention resources which have been disabled can be automatically started as needed without action on the part of the user or operator of the system.

With the present invention an OEM system integrator can provide a system which is both fully compatible to the iAPX 86 programming architecture and which nevertheless uses the power of the processor itself to provide added or distinguishing features.

SUMMARY OF THE INVENTION

The present invention provides a microprocessor with a special OEM mode of operation that can be used by an OEM system integrator to implement special tasks such as power management. The present invention takes into account the fact that single chip microprocessors are "commodity" chips that are integrated in a variety of different systems by OEM system integrators. The OEM mode provided by the present invention is designed for use by a system integrator who integrates a microprocessor into a larger system such as a personal computer. The OEM mode of the present invention is not designed for use by the programmer or operator who is using a system built by a system integrator.

System integrators have two potentially conflicting desires. First, a system integrator wants the final system to be fully compatible with the programming specifications for the microprocessor chip that is being used, that is, a system integrator wants the final system to be able to run all programs which are written to run on a conventional microprocessor of the type being used. Second, a system integrator wants the final system to have differentiating features from other systems which are implemented using the same microprocessor. The OEM mode of operation provided by the present invention allows an OEM system integrator to satisfy these two potentially conflicting requirements.

The OEM mode of operation provided by this invention provides a means for executing special programming in the microprocessor that add special features or functions to the overall system; however, the special programming is transparent to system users and programmers. For example, a system integrator can use the OEM mode to configure a system so that the system will periodically run a special power management program that provides certain special power management features. The program that is periodically run with the processor in OEM mode will not be accessible to or interfere with any other programs which a programmer or operator loads into the system.

The various operating modes in a conventional microprocessor such as a 386 are accessed or initiated by internal instructions or actions. The OEM mode provided by the present invention is accessed by an external signal on a special I-O pin. For example, an external timer can periodically provide signals to this special pin, thereby periodically interrupting the microprocessor and putting the microprocessor in the OEM mode. Upon entering the OEM mode, the processor saves its configuration and status in a special memory space that is beyond the addressing range of the memory space normally accessed by the microprocessor. Special programming, such as power management code, stored in an external device such as a ROM is executed each time the microprocessor is placed in OEM mode. At the end of the operations performed in OEM mode, the microprocessor is restored to the state where the OEM mode of operation began.

A special configuration bit is provided. When this bit is set and the processor is about to execute an I-O instruction, the processor enters OEM mode before the I-O instruction is performed. In this way, power consuming resources such as disk drives can be powered down when they are not required by I-O operations and the power can be restored prior to the execution of an I-O instruction.

DESCRIPTION OF A PREFERRED EMBODIMENT OF THE INVENTION

Figure 1:
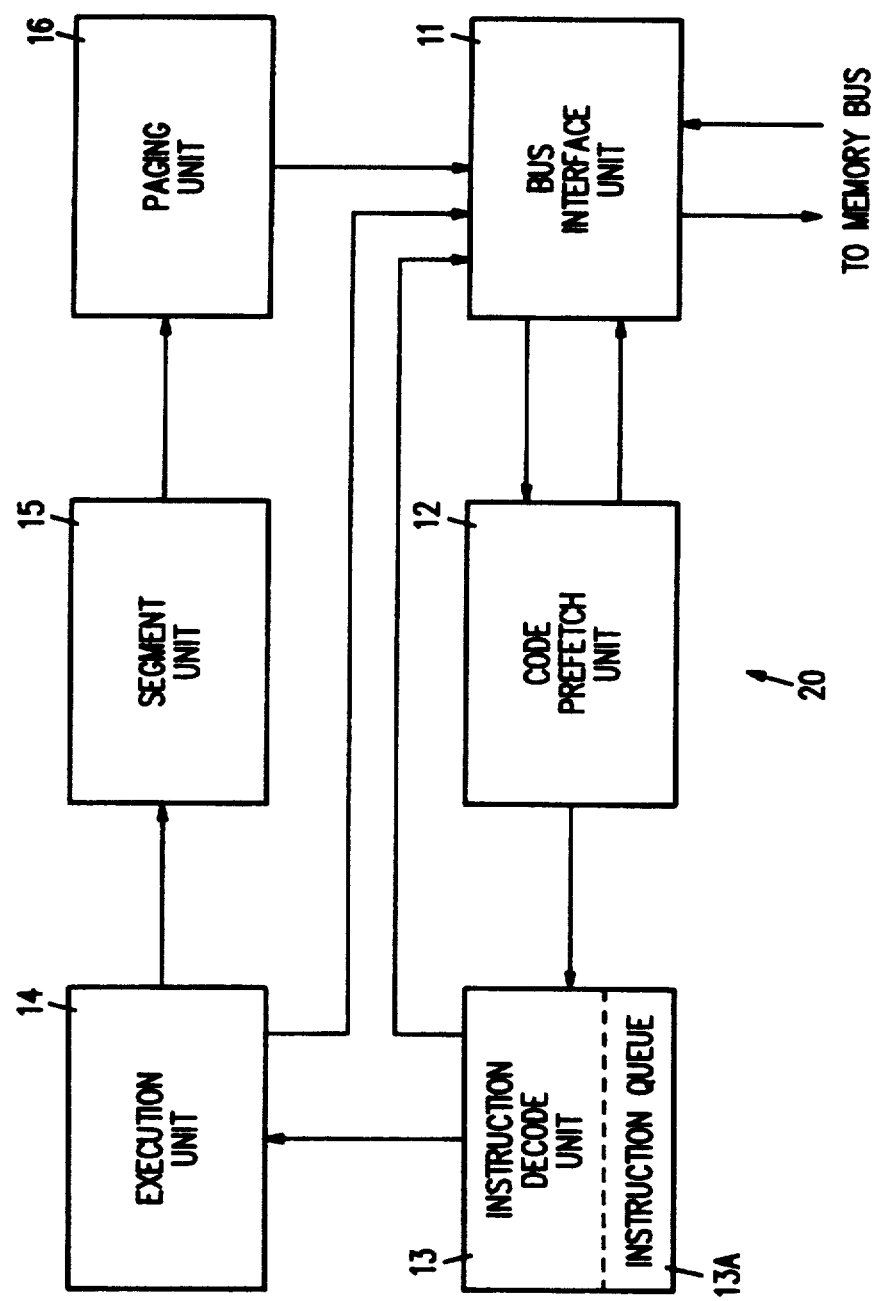
FIG. 1 shows a general block diagram of a conventional 386 microprocessor.

The present invention will be described herein as applied to a 386 microprocessor. FIG. 1 shows the overall organization of a conventional 386 microprocessor 20. There are six basic units, namely, the bus interface unit 11, the code prefetch unit 12, the instruction decode unit 13, the execution unit 14, the segment unit 15, and the paging unit 16.

The present invention does not require any changes or modifications in the 386 architecture as that architecture is described in the various Reference Manuals that are available for the 386. All programs that conform to the requirements for 386 programs (i.e. all programs that run on a normal 386 system) will operate on a system that includes the present invention.

The basic units in a 386 shown in FIG. 1 perform the following operations: The bus interface unit 11 provides a connecting link between the 386 microprocessor and the other elements in a system. All memory and I-O operations are handled by the bus interface unit 11. The code prefetch unit 12 insures that instructions are ready and available when they are needed by the instruction decode unit 13. When the instruction decode unit 13 receives instructions it determines what type of instruction it has received and what type of data will be required for execution of the instruction. It requests any needed data from the bus interface unit ii. The instruction decode unit 13 includes an instruction queue 13A which provides a series of instructions which are ready for execution by the execution unit 14.

The execution unit 14 performs the computations needed to carry out each instruction. The execution unit 14 can send data directly to the bus interface unit 11. The segment unit 15 translates logical addresses into literal addresses and the paging unit 16 translates linear addresses into physical addresses. The function and organization of these units are explained in many publicly available references such as the following books, "Intel's Official Guide to 386", 1991 by Michael Edelhart, published by Osborne, McGraw-Hill, or "Advanced 80386 Programming Techniques" by James L. Turley, published by Osborne Mc Graw Hill, 1988, or "386 DX Microprocessor Hardware Reference Manual" published by Intel Corporation 1990.

Figure 2:
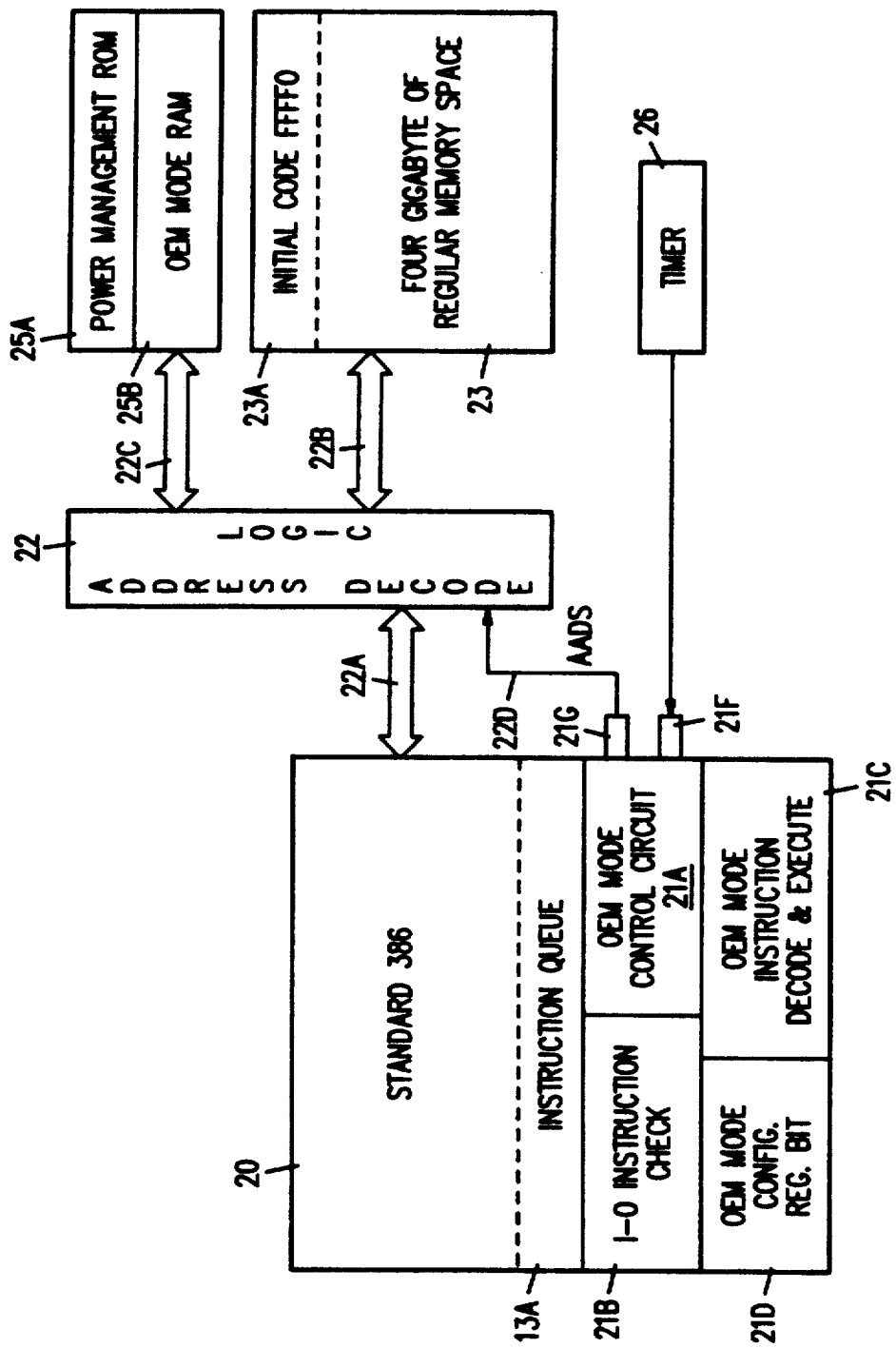
FIG. 2 is a block diagram showing the system organization showing the present invention applied to a 386 microprocessor.

As shown in FIG. 2, the present invention adds the following components to the 386 microprocessor 20 shown in FIG. 1: OEM mode control circuit 21A, I-O Instruction check 21B, OEM instruction decode and execution logic 21C, OEM mode configuration bit 21D, OEM mode I-O pin 21F, AADS memory pin 21G, power management ROM 25A, OEM RAM 25B, and timer 26. FIG. 2 also shows the four gigabytes of regular memory space 23 and address decode logic 22. The address decode logic 22 includes the normal decode logic for four gigabytes of regular memory space augmented by additional addressing logic for the additional memory 25A and 25B. Memory 25A and 25B is addressed in place of memory 23 when AADS strobe line 22D is active. The normal memory strobe ADS is deactivated when AADS line 22D is activated. The ADS strobe line is not shown in FIG. 2 however it is shown in the cited references.

OEM mode of operation is initiated by the assertion (i.e. the activation) of I-O pin 21F. When pin 21F is asserted:

1) AADS memory strobe line 22D is active and the normal memory 23 is no longer addressed, instead the processor addresses the memory 25A and 25B. The AADS signal is the equivalent of an additional high order memory address bit in the memory address.

2) The processor configuration is stored in OEM mode RAM 25B.

3) The processor begins to execute instructions from power management ROM 25A.

Memory 25A and 25B are outside of the normal four gigabytes of memory space that is associated with a 386 microprocessor. Assertion of AADS line 22D causes the Address Decode logic 22 to address space beyond the normal memory space, that is, assertion of AADS line 22D causes the microprocessor to address power management ROM 25A and OEM mode RAM 25B. Memory 25A and 25B is a separate address space from the user's normal address space. Memory 25A and 25B is not accessible from either the operating system or from the user software. When the AADS line is active, the address logic 22 acts as if the memory address had thirty three bits and the high order bit is "1". Thus, when the AADS line 22D is active, it appears as though memory exists between address 0 and address 7FFFFFFF, and the memory repeats identically from 80000000 to FFFFFFFF. Upon entering OEM mode, certain data from the microprocessor (as explained later) is saved starting at the top of the memory. The contents of the CS, SS and DS registers is altered to correspond to a real memory model starting at address 0 with no possibility of encountering a limit exception. Execution of the power management program in ROM 25A then begins at address 0.

There are three special OEM mode instructions, namely:

| OP CODE | OPERATION PERFORMED |
|---------|---------------------|
| 0FE0 | SET OEM Register Configuration Bit |
| 0FE1 | RESET OEM Register Configuration Bit |
| 0FE2 | EXIT OEM MODE |

The instruction in the iAPX 86 instruction set have two byte OP codes. Instructions which begin with the "0F" byte are undefined in the 386 architecture. That is, a 386 instruction will not perform any operation (other than reporting an exception) if it encounters an instruction where the first OP code byte is a "0F". With the present invention, if the processor is in OEM mode, instructions with OP codes 0FE1, 0FE1, and 0FE2 are detected by OEM mode control circuit 21A and passed to OEM mode instruction decode and execute circuit 21C.

The processor switches from normal operation to OEM mode in one of two ways:
1) When pin 21F is asserted;
2) When a normal I-O instruction is encountered, and the OEM mode bit 21D has been previously set.

When the processor enters OEM mode, the following occur.

a) Memory strobe AADS 22D is activated, and all subsequent memory access requests are directed to memory 25A or 25B.

b) The status of the processor is stored in memory 25B.

c) Subsequent requests for instructions are directed to memory 25A.

Figure 3:
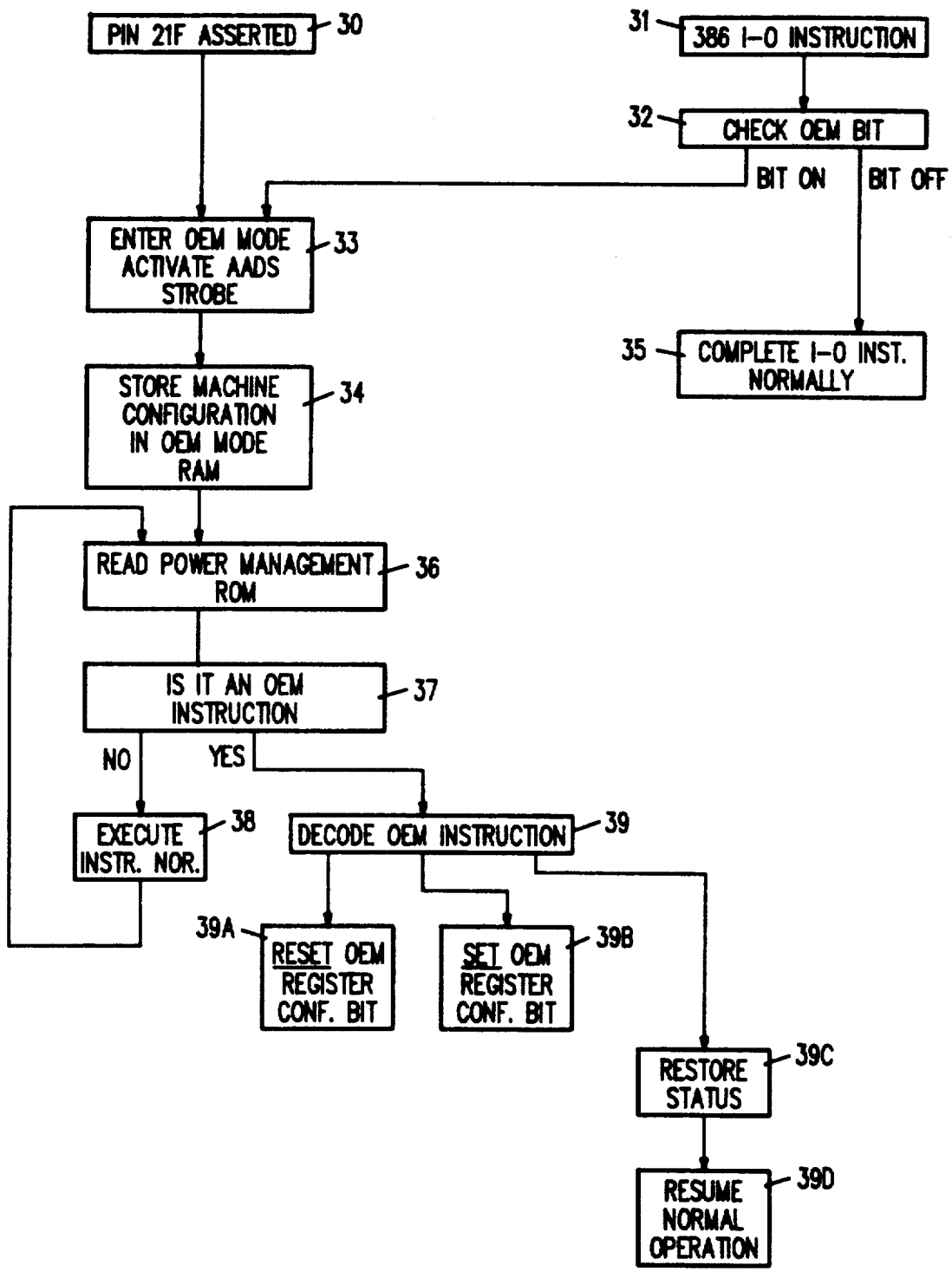
FIG. 3 is flow diagram showing operation of the preferred embodiment of the present invention.

The operation of processor when it is in OEM mode is illustrated by the flow diagram given in FIG. 3. As illustrated by blocks 30, 31, 32 and 33, OEM mode is initiated (block 33) when either pin 21F is asserted or as indicated by blocks 31 and 32, when a 386 I-O instruction is executed, and the OEM bit 21D has previously been set to ONE. If the OEM bit 21D is not set to ONE when a 386 I-O instruction is encountered, the I-O instruction is completed in the normal manner (block 35). As indicated by block 33 when OEM Mode is imitated, the AADS line is activated and the machine status is stored in OEM Mode RAM 25B (block 34). It is noted that since memory 25B can only be accessed when the AADS line is activated, there is no possibility that the operations in OEM mode will corrupt data stored during some normal 386 operation. Once the machine status is stored, the program in the Power Management ROM 25A is read (block 36).

When the processor is in OEM mode, all instructions are executed in a normal manner except that since the AADS line is active and ADS line (not shown) is inactive, memory requests respond as if there is an additional high order address bit which is set to ONE and thus the requests are outside the normal four gigabytes of normal address space. That is, memory requests are directed to memory 25A and 25B. Thus, OEM mode has its own level of memory protection.

If one of the OEM instructions are encountered while the processor is in OEM mode, that is, if an OP code 0FE0, 0FE1 or 0FE2 is encountered (blocks 37 and 39) special instruction execution logic is activated.

If a OEM reset instruction "0FE0" is encountered (block 39B), the OEM mode bit 21D is set. Thereafter when an I-O instruction is encountered the OEM mode will be initiated. If a OEM reset instruction "0FE1" is encountered (block 39A), the OEM mode bit 21D is reset. Thereafter I-O instructions will not initiate initiation of OEM mode.

If an Exit OEM Mode instruction 0FE2 is encountered, the processor status is restored to the state it was in when the OEM mode was initiated. The status of the processor is restored using the information in OEM Mode RAM 25B (block 39C) and normal operations resume (block 39D).

It should be noted that other special OEM instructions could be added for various special operations; however, such additional instructions are not necessary to implement the basic concept of the invention.

It is also noted that OEM bit 21D can be one bit in an OEM mode register. While only one OEM mode bit 21D is used for the embodiment of the invention as shown herein, other bits in an OEM mode register could be used for other purposes in more complex implementations of the invention.

Figure 4:
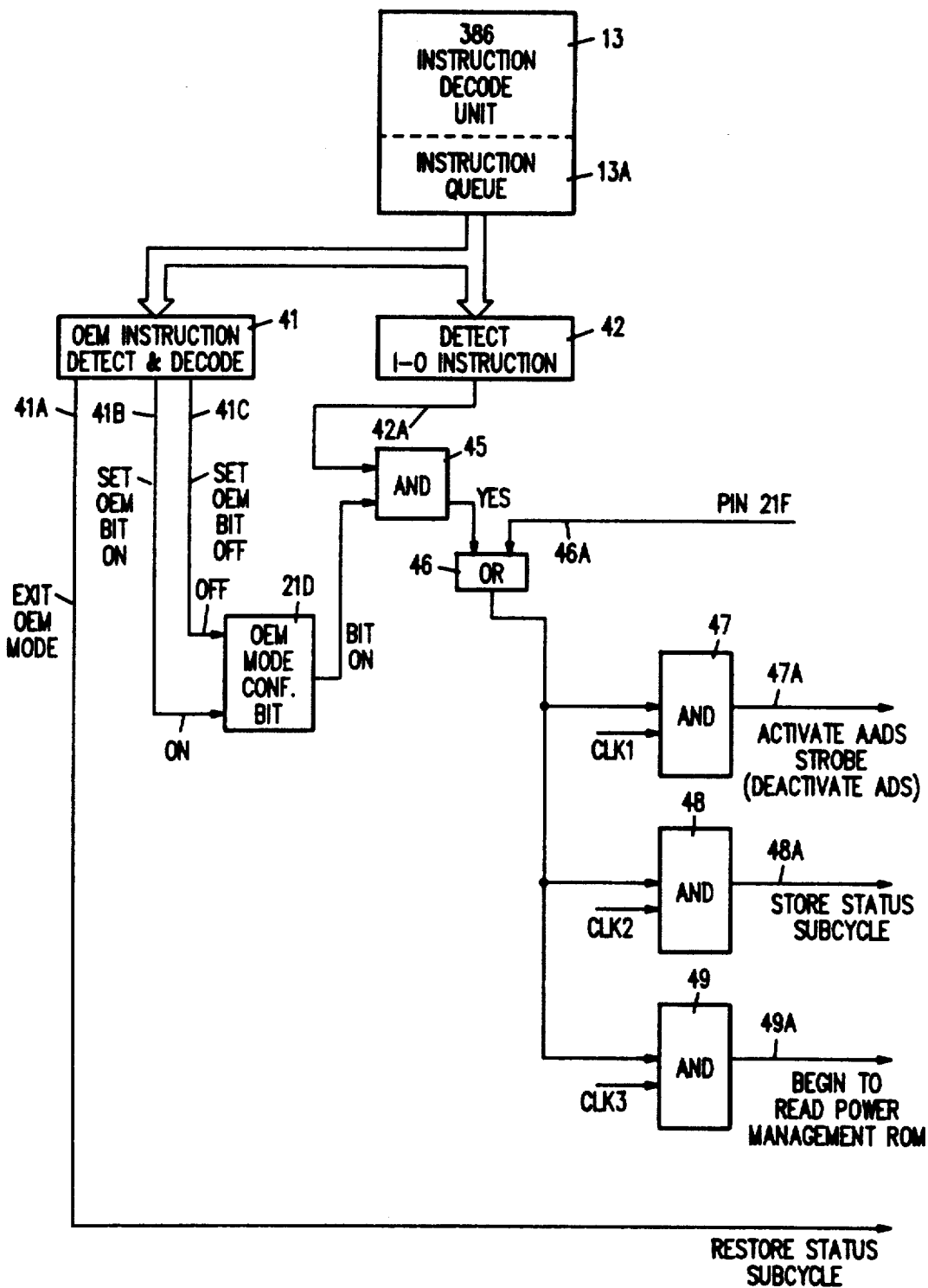
FIG. 4 is a logical block diagram of the circuitry of the preferred embodiment of the invention.

A detailed logical diagram of the circuitry in OEM mode control circuit 21A, I-O Instruction check 21B, OEM Instruction Decode and execution circuit 21C and OEM mode configuration bit 21D is shown in FIG. 4. The logic includes circuit 41 which is connected to the Instruction Queue 13A in the normal 386 circuitry and which decodes OP codes 0FE0, 0FE1 and 0FE2 into the signals 41A, 41B and 41C which respectively indicate, EXIT OEM MODE, SET OEM BIT ON, and SET OEM BIT OFF. Circuit 42 detects the presence of an I-O instruction in the Instruction Queue. This can be done by AND-OR logic that detects the OP code bits that represent an I-O instruction. The logic circuitry which implements the present invention interfaces with the normal logic in the 386 microprocessor at the Instruction Queue 13A. As shown in FIG. 4, circuits 41 and 42 detect the presence of either an I-O instruction or an OEM instruction 0FE0, 0FE1, or 0FE2 as the first (the next to be executed) instruction in the instruction queue 13A. Circuits 41 and 42 merely consist of AND-OR gates which detect the presence of a particular combination of bits.

When circuit 42 detects an I-O instruction in the instruction queue, one input of AND gate 45 is activated. The second input of AND gate 45 is activated by the OEM bit 21D. If the OEM bit is not set when an I-O instruction is detected, the operation of the 386 microprocessor proceeds in a normal fashion. If the OEM bit is set when an I-O instruction is detected, gates 47 to 49 are sequentially activated. The sequence is established by sequential clock signals CLK1 to CLK3. First, in response to a signal from AND gate 47, line AADS 22D is activated (and the ADS line not shown is deactivated) to insure that only memory beyond the normal four gigabytes of memory can be accessed. Next, the status of the microprocessor (i.e. the contents of registers and other status information) is stored in OEM mode RAM 25B. Information is loaded into the General Purpose Registers to indicate the cause of the entry and the contents of the CS, SS, and DS registers in the 386 are set to correspond to a real memory model starting at address 0 with no possibility of encountering a limit exception. Execution then begins at address 0.

While additional information can be stored when the system enters OEM mode, as a minimum the following information needs to be stored:

| Register | Address | size | New Value |
|---|---|---|---|
| CR0 | 7FFFFFFC | 4 | pe=0, pm=0 |
| EIP | 7FFFFFF8 | 4 | 0 |
| EFLAGS | 7FFFFFF4 | 4 | unchanged |
| EAX | 7FFFFFF0 | 4 | 00000L0C |
| | | | L=Inst. Length |
| | | | C=0 - ANMI |
| | | | C=1 - IN |
| | | | C=2 - OUT |
| | | | C=3 - INS |
| | | | C=4 - OUTS |
| EDX | 7FFFFFEC | 4 | Port |
| EBX | 7FFFFFE8 | 4 | Operand Size |
| ESP | 7FFFFFE4 | 4 | 7FFFFFC4 |
| DR7 | 7FFFFFE0 | 4 | 0 |
| CS Descrp | 7FFFFFD8 | 8 | base=0,limit=4GB |
| SS Descrp | 7FFFFFD0 | 8 | base=0,limit=4GB |
| GS Descrp | 7FFFFFC8 | 8 | base=0,limit=4GB |
| CFG | 7FFFFFC4 | 4 | IFetch off |
| | | | Cache off |

-continued

| Register | Address | size | New Value |
|---|---|---|---|
| | | | Ext. Inst. ON |

The software stored in the power management ROM 25A can examine the configuration register to determine the state of the CPU upon entry into OEM mode. In OEM mode I-O operations never cause an I-O fault as they can do in user mode. This allows the OEM mode program to emulate I-O operations directly. Processor exceptions and interrupts do not cause anything to happen when the processor is in OEM mode. For this reason, the programmer who writes the power management code in the ROM 25A must be careful not to execute undefined or illegal op codes. These features need to be ignored in OEM mode because the 0FE0, 0FE1, and 0FE2 instructions appear as illegal op codes to the normal system. Furthermore, the code in ROM 25A should not use features such as paging, limit checking, debug, or protected mode since these will cause undefined actions.

The timer 26 periodically activates pin 21F, thereby periodically putting the microprocessor in OEM mode and periodically causing the microprocessor to execute the power management programming code in power management memory 25.

The particular power management routines stored in ROM 25A do not constitute part of the present invention. The periodically executed code in ROM 25A could be as simple as code that allows the operator to set a counter to zero when a new battery is installed and which increments this counter each time the processor goes into OEM mode. When the value of the counter passes a certain threshold, the value of the counter or a bar graph showing the value would be automatically displayed to the operator to indicate the status of the battery. Alternatively the power management code could be very sophisticated such that it keeps track of which power consuming resources are being used and it turns these resources to a low power state if they have not been used for a certain period of time. The power consuming resources would be automatically powered up by the code when called for by an I-O instruction. As another alternative the OEM mode could be used to serve as the processor for keyboard inputs rather than having a separate processor to handle the keyboard as is done in may personal computer. The present invention is directed to providing the OEM mode, not to the way in which OEM mode is used by the OEM manufacturer or system integrator.

The physical structure of the present invention includes a single integrated circuit that includes the standard 386 microprocessor and the units 21A to 21D. This integrated circuit chip includes two I-O pins 21F and 21G which are in addition to the normal I-O pins required for a 386 microprocessor.

While the invention has been shown and described with reference to a preferred embodiment, it should be understood that various changes in form and detail may be made without departing from the spirit and scope of the invention. For example while the drawings show blocks that can be interpreted as representing hardware logic, these same logical blocks can be implemented by programmed logic. Furthermore, it should be noted that the placement of the logic is not relevant to the present invention, The logic in units 21A to 21D could be separate logical units or this logic could merely be additions to the logic in the corresponding units in the 386 microprocessor.

Furthermore, while only three new OEM instruction are shown herein, in order to perform various functions a wide variety of new instructions could be added which could only be executed in the OEM mode. Applicant's invention is limited solely the appended claims.

I claim:

1. In combination with a single chip integrated circuit microprocessor which has an associated address space,
   a register for storing a special configuration bit,
   means for setting said special configuration bit,
   means for addressing a special address space beyond said address space associated with said microprocessor,
   detection means for detecting I-O instructions ready for execution by said microprocessor,
   means for interrupting the operation of said microprocessor, for storing the status thereof in said special address space, and for reading instructions from said special address space when said detection means detects an I-O instruction, and said special configuration bit is set,
   whereby when said special configuration bit is set, prior to the execution of an I-O instruction, said microprocessor executes instructions stored in said special address space.

2. The combination recited in claim 1 wherein said microprocessor is a 386 microprocessor.

3. The combination recited in claim 2 including means for detecting a special instruction not in the architecture of said 386 microprocessor.

4. The combination recited in claim 3 including means for restoring the status of said microprocessor using the data stored in said special address space.

5. The combination recited in claim 1 wherein said microprocessor has the architecture of a 386 microprocessor and where the address space associated with said microprocessor is four gigabytes in size, and where said special address space is outside said four gigabytes of address space.

6. In combination with a microprocessor in the iAPX 86 family, said microprocessor having a first address space,
   a special I-O pin,
   means for initiating a second mode of operation in response to a signal on said special I-O pin,
   means for storing the status of said microprocessor in a second memory space which is outside said first address space when said second mode of operation is initiated, and
   means for reading programming commands from said second memory space when said second mode of operation has been initiated,
   whereby signals on said special I-O pin can cause said microprocessor to execute programs that are stored in said second address space.

7. The combination recited in claim 6 including means for executing a plurality of special instructions when said microprocessor is in said second mode.

8. The combination recited in claim 7 including,
   means for storing a special configuration bit,
   means for placing said microprocessor in said second mode when said special configuration bit is set and said microprocessor is about to begin executing an I-O instruction.

9. The combination recited in claim 8 wherein said special instructions include an instruction to set said special configuration bit, an instruction to reset said special configuration bit and an instruction to exit said second mode.

10. In combination with a 386 microprocessor which has four gigabytes of associated address space,
    a configuration register for storing a special configuration bit,
    means for executing an instruction which sets said special configuration bit
    means for addressing a special address space outside said four gigabytes of address space associated with said 386 microprocessor,
    detection means for detecting I-O instructions ready for execution by said 386 microprocessor,
    means for interrupting the operation of said 386 microprocessor, for storing the status thereof in said special address space, and for reading instructions from said special address space when said detection mans detects an I-O instruction, and said special configuration bit is set,
    whereby when said special configuration bit is set, prior to the execution of an I-O instruction, said 386 microprocessor executes instructions stored in said special address space.

* * * * *